(12) United States Patent
Liao et al.

(10) Patent No.: US 7,004,633 B2
(45) Date of Patent: Feb. 28, 2006

(54) ROLLING ELEMENT RETAINER

(75) Inventors: Chi-Meng Liao, Taichung (TW);
Chin-Pei Wang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 48 days.

(21) Appl. No.: 10/724,935

(22) Filed: Dec. 1, 2003

(65) Prior Publication Data

US 2005/0117820 A1   Jun. 2, 2005

(51) Int. Cl.
*F16C 29/04* (2006.01)

(52) U.S. Cl. .......................................... 384/45; 384/51

(58) Field of Classification Search .................. 384/51, 384/43, 45, 520, 523, 525, 530; 74/424.88
See application file for complete search history.

(56) References Cited

U.S. PATENT DOCUMENTS 4,598,957 A * 7/1986 Shibayama ................. 384/51
6,102,572 A * 8/2000 Hidano ....................... 384/45
6,247,846 B1 * 6/2001 Shirai ......................... 384/45
6,286,383 B1 * 9/2001 Shirai et al. ............. 74/424.88
6,779,923 B1 * 8/2004 Murata ....................... 384/44

FOREIGN PATENT DOCUMENTS

FR         2617253 A1 * 12/1988

* cited by examiner

*Primary Examiner*—Thomas R. Hannon
(74) *Attorney, Agent, or Firm*—Charles E. Baxley

(57) ABSTRACT

A rolling element retainer whose respective components are allowed to move angularly with respective to each other, and the engagement between the ring portion and the trough of the respective units is in form of the engagement of cylindrical ring portion with curved surface. By this way, the universal cornering ability of the rolling element retainer in accordance with the present invention can be substantially improved, which is able to slide smoothly along the circulation path of the linear transmission device without being warped and prolong the service life.

7 Claims, 12 Drawing Sheets

ROLLING ELEMENT RETAINER

BACKGROUND OF THE INVENTION

1. Field of the Invention

The present invention relates to a rolling element retainer, and more particularly to a rolling element retainer which is applied to linear transmission device, wherein the linear transmission is applied to mechanical, electronic, automatic or semiconductor equipments.

2. Description of the Prior Arts

Conventional rolling element retainer can generally be divided into two categories: the first type of rolling element retainer is a single independent unit; the second type of rolling element retainer is comprised of plural independent units. Referring first to FIG. 11, wherein a slide block is slidably mounted onto a rail, the slide block is interiorly provided with rolling elements 30, between the rolling elements 30 is defined with plural single independent retainers 40 for preventing collisions of the rolling elements 30 with each other. In assembly, it is very time-consuming for the workers because they have to sequentially assemble the respective rolling members and the single independent retainers one by one into the slide block. Furthermore, the single independent retainers need to be tightly contacted the rolling elements, otherwise, the respective single retainers are susceptible to disengaging from the rolling elements at both sides, such that the circulation path will be jammed. But if the contact is too tight, which will lead to a bigger friction between the retainers and the rolling elements.

Referring again to FIG. 12, which shows a rolling element retainer comprised of plural independent units, wherein the rolling element retainer 41 includes plural partitions 411 which are connected with a flexible chain 412, so as to allow respective rolling elements 30 to rotatably receive in intervals between the respective partitions 411. Such kind of retainer 41 is produced by initially putting the rolling elements into mould, and then processed with plastic ejection molding, however, the requirement on the quality of the plastic material and the performance of the ejection molding machine is very strict, and thus the cost is relatively increased. Furthermore, due to the special manufacturing methods, the contact between the rolling elements and the partitions is kind of tight, which will result in a big rolling friction, accordingly the cornering ability of this kind of rolling element retainer is limited. The present invention has arisen to mitigate and/or obviate the afore-described disadvantages of the conventional rolling element retainer.

SUMMARY OF THE INVENTION

The primary object of the present invention is to provide a rolling element retainer which is possessed with better cornering ability, such that the rolling element retainer is allowed to freely move in a complicated circulation path, and the rolling elements can roll smoothly.

In accordance with one aspect of the present invention there is provided with a rolling element retainer which having intervals for sequentially receiving plural rolling elements and generally comprising plural partitions serving to separate the rolling elements from each other, each partition provided at both sides with a curved face in corresponding to curvature of the rolling elements; a plural link-rings employed to connect the partitions; each of the partitions and the link-rings is independent unit, the rolling element retainer in accordance with the present invention being comprised of such plural independent units, the engagement between the respective independent units is in a form that a cylindrical ring portion angularly movable engages with a curved surface, by this way, a rolling element retainer with desired length can be formed by alternatively connecting the link-rings and the partitions together, such that the rolling element retainer can be possessed with better cornering ability in universal direction.

The present invention will become more obvious from the following description when taken in connection with the accompanying drawings, which shows, for purpose of illustrations only, the preferred embodiment in accordance with the present invention.

BRIEF DESCRIPTION OF THE DRAWINGS

FIG. 10 shows both ends the curved rolling element retainer in

FIG. 9 being connected together to form a ring shape;

DETAILED DESCRIPTION OF THE PREFERRED EMBODIMENTS

Figure 1:
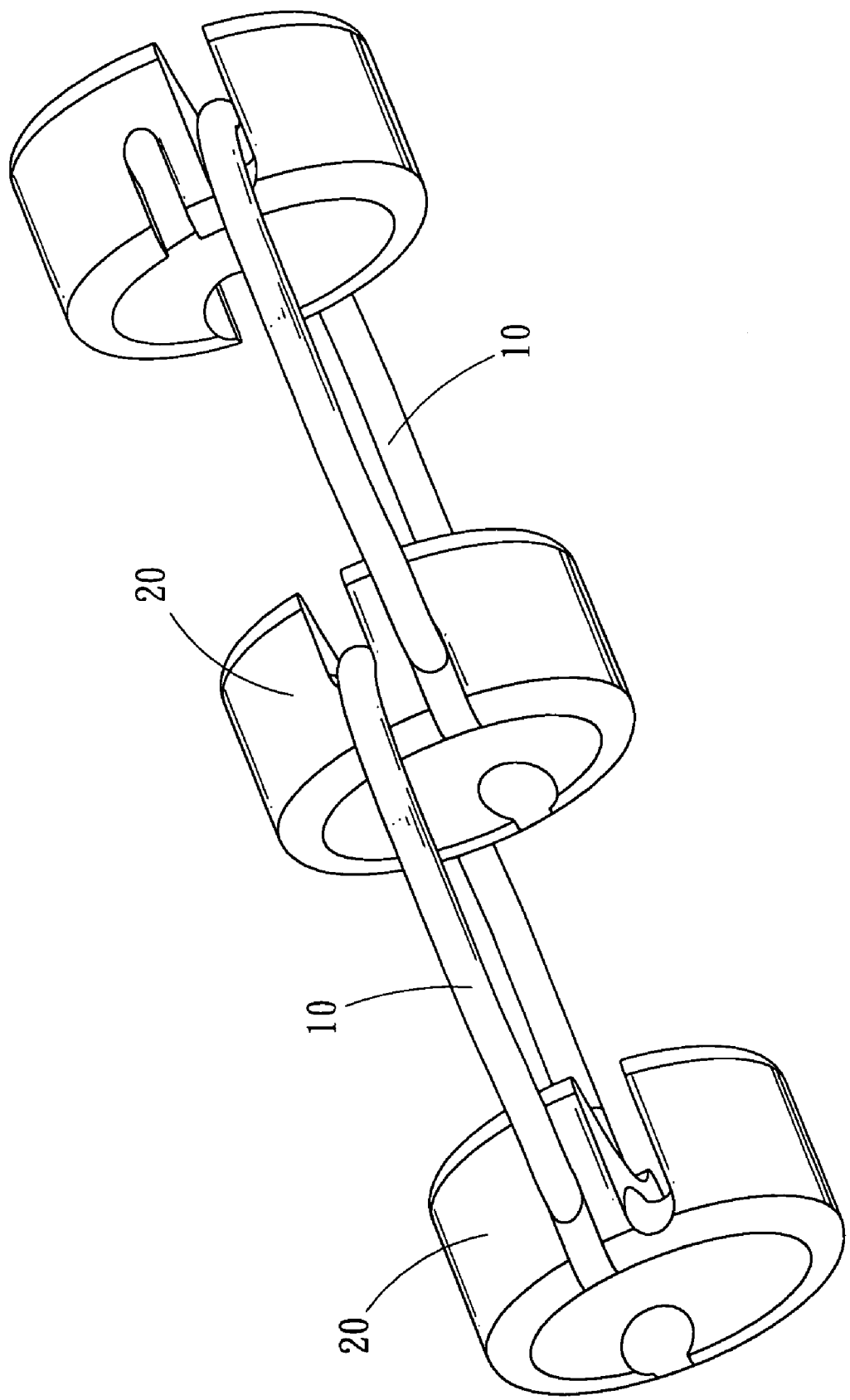
FIG. 1 is a perspective view of a rolling element retainer in accordance with the present invention.

Referring to FIG. 1, wherein a rolling element retainer is shown and generally comprised of partitions 20 and link-rings 10. The partitions 20 serve to separate rolling elements (not shown) from each other so as to reduce frictions, whereas the link-rings 10 are employed to connect the partitions 20. In assembly, an end of the link-ring 10 is fixed to a partition 20 and another end of the link-ring 10 is connected to another partition 20, such that a retainer with a certain length can be formed by connecting the link-rings 10 with the partitions 20 alternatively together.

Figure 2:
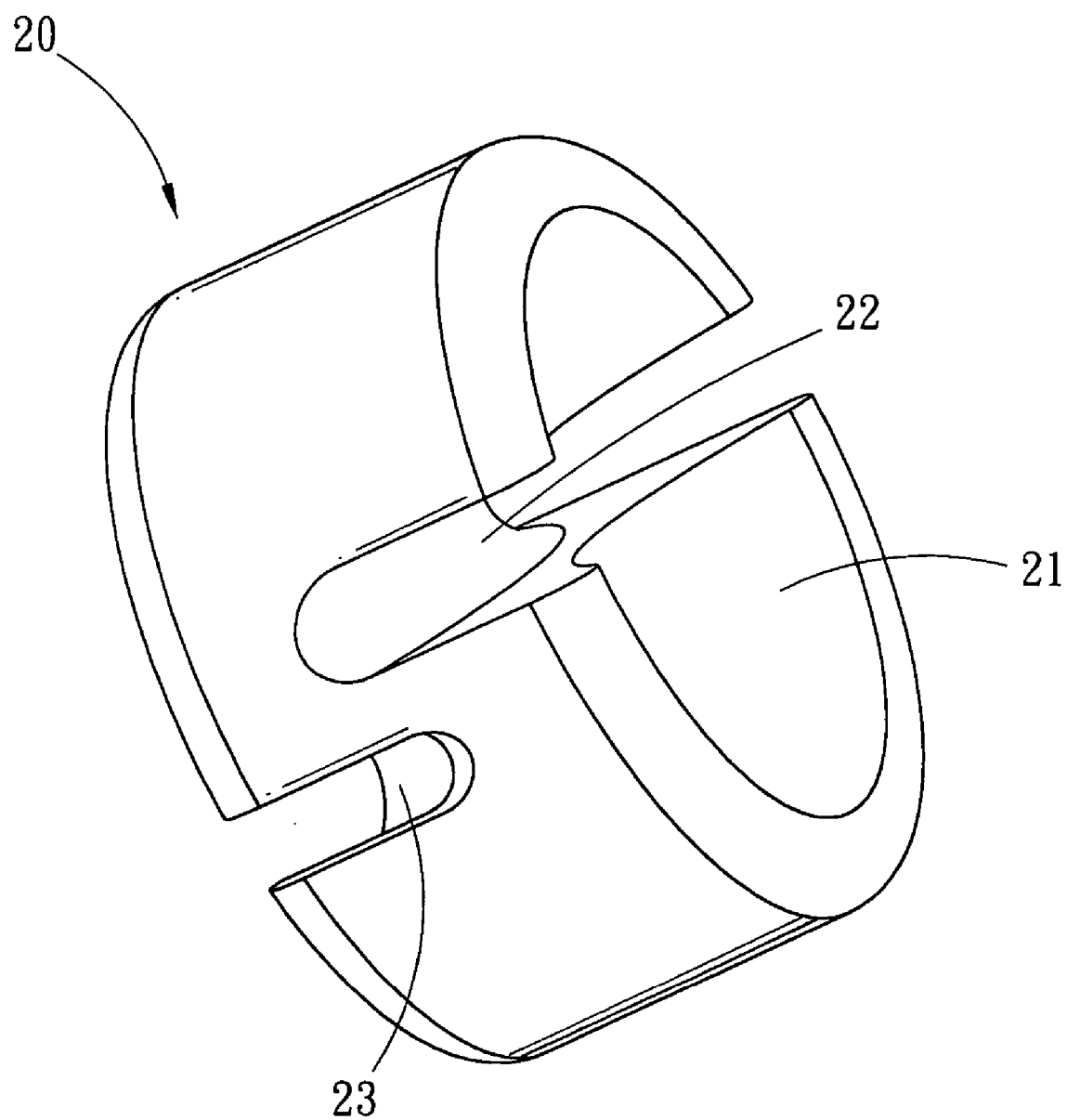
FIG. 2 is a perspective view of a partition of FIG. 1.
Figure 3:
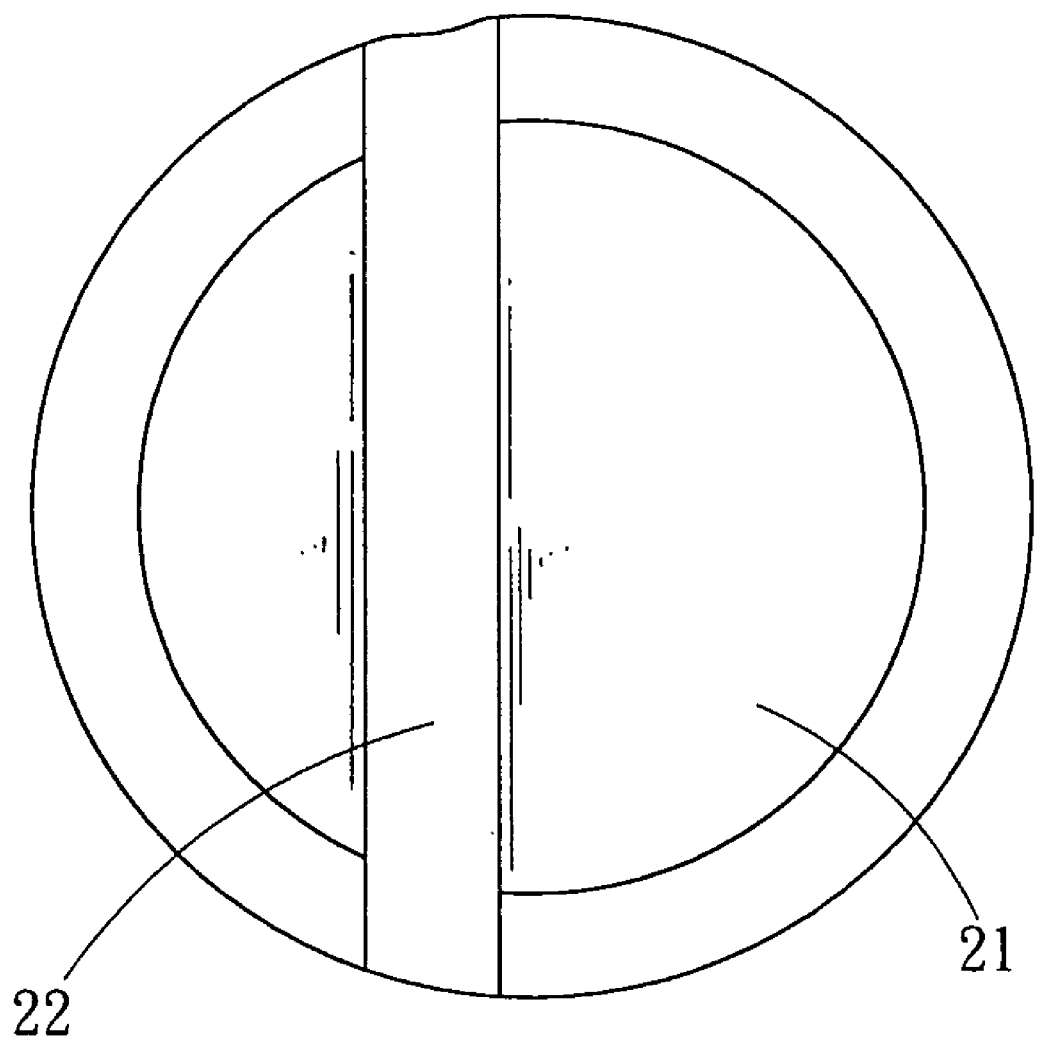
FIG. 3 is a right side view of the partition in FIG. 1.
Figure 4:
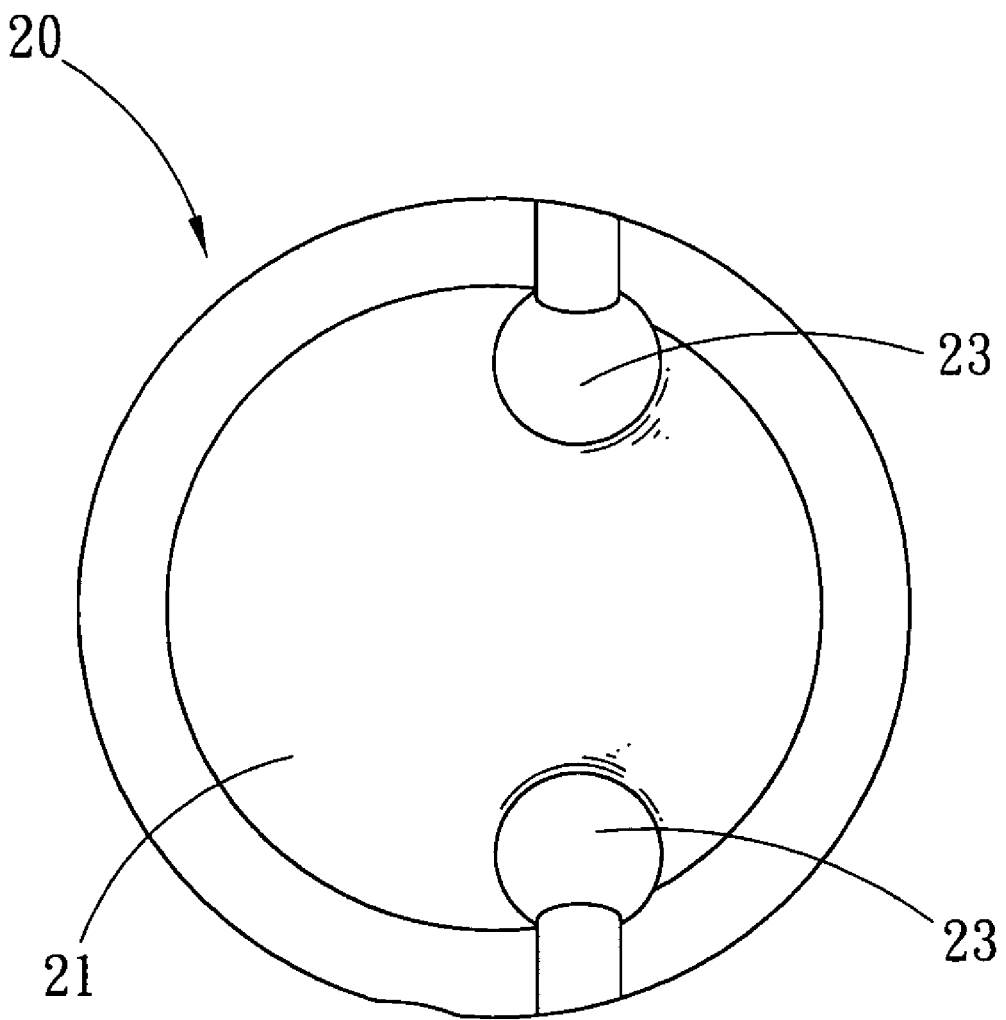
FIG. 4 is a left side view of the partition in FIG. 1.

Referring to FIGS. 2–4, wherein the partition 20 is provided at both sides thereof with a curved face 21 respectively in corresponds to the curvature of the rolling element (not shown). One side of the partition 20 is provided with a trough 22 having curved bottom, whereas opposite side of the partition 20 is defined with a groove 23, such that the partition 20 can be connected to the link-ring 10 of FIG. 1 and forms a rolling element retainer. In addition, since the trough 22 of the partition 20 is designed as having curved bottom, which allows relative angular movement in left-to-right direction between the partition 20 and the link-ring 10.

Figure 5:
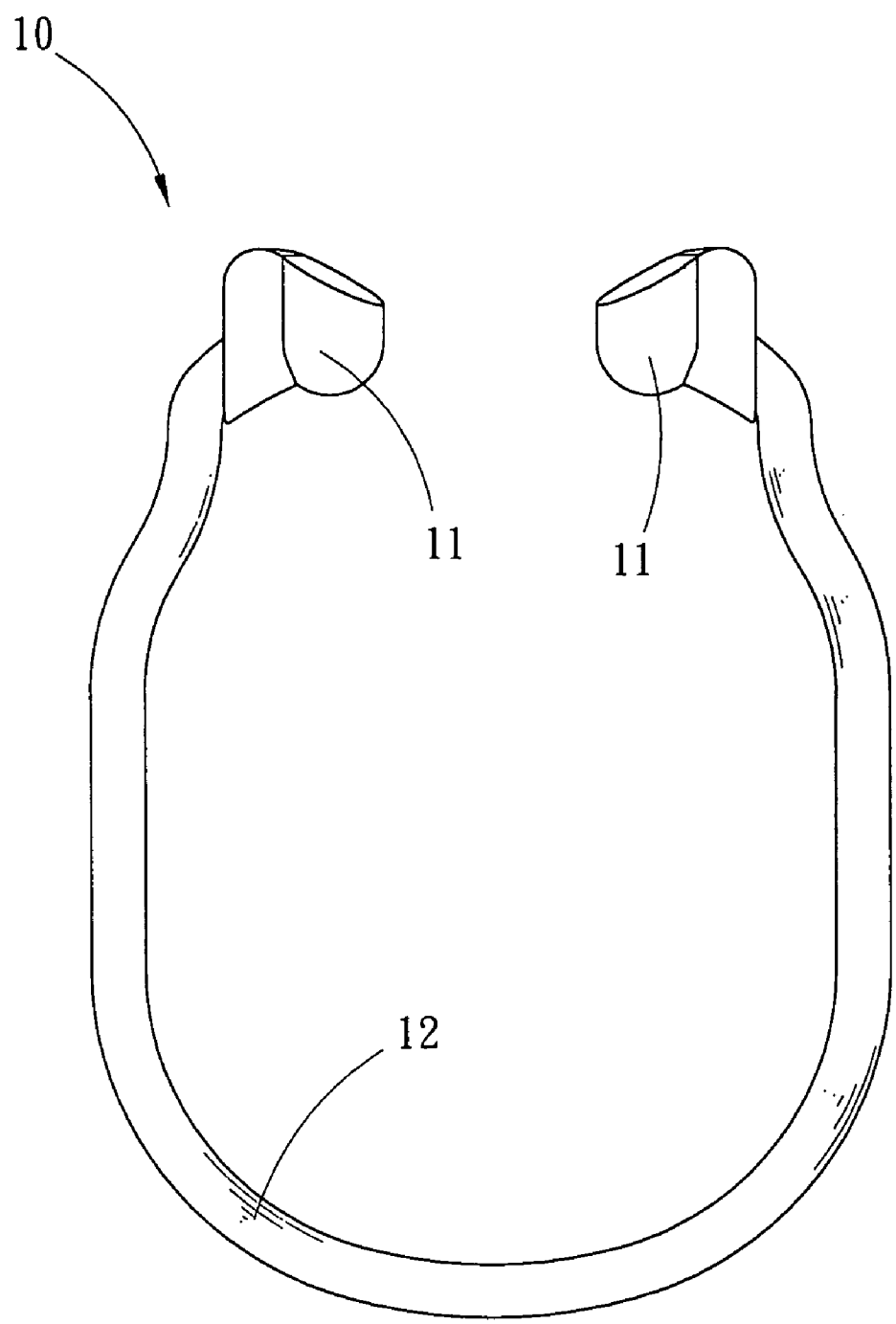
FIG. 5 is an illustrative view of a link-ring in FIG. 1.

Referring to FIG. 5, wherein the connecting 10 is shaped as an incomplete ring, which has a first open end provided with two fixing ends 11 for engaging the groove 23 of the partition 20, and also has a second end provided with slight cylindrical-shaped ring portion 12 for engaging the trough 22 of the partition 20 as shown in FIG. 2. By such arrangements, a rolling element retainer can be formed by connecting plural link-rings 10 with plural partitions 20. Since the ring portion 12 of the link-ring 10 is slightly cylindrical shaped, which allows relative angular movement in vertical direction between the partition 20 and the link-ring 10.

Figure 6:
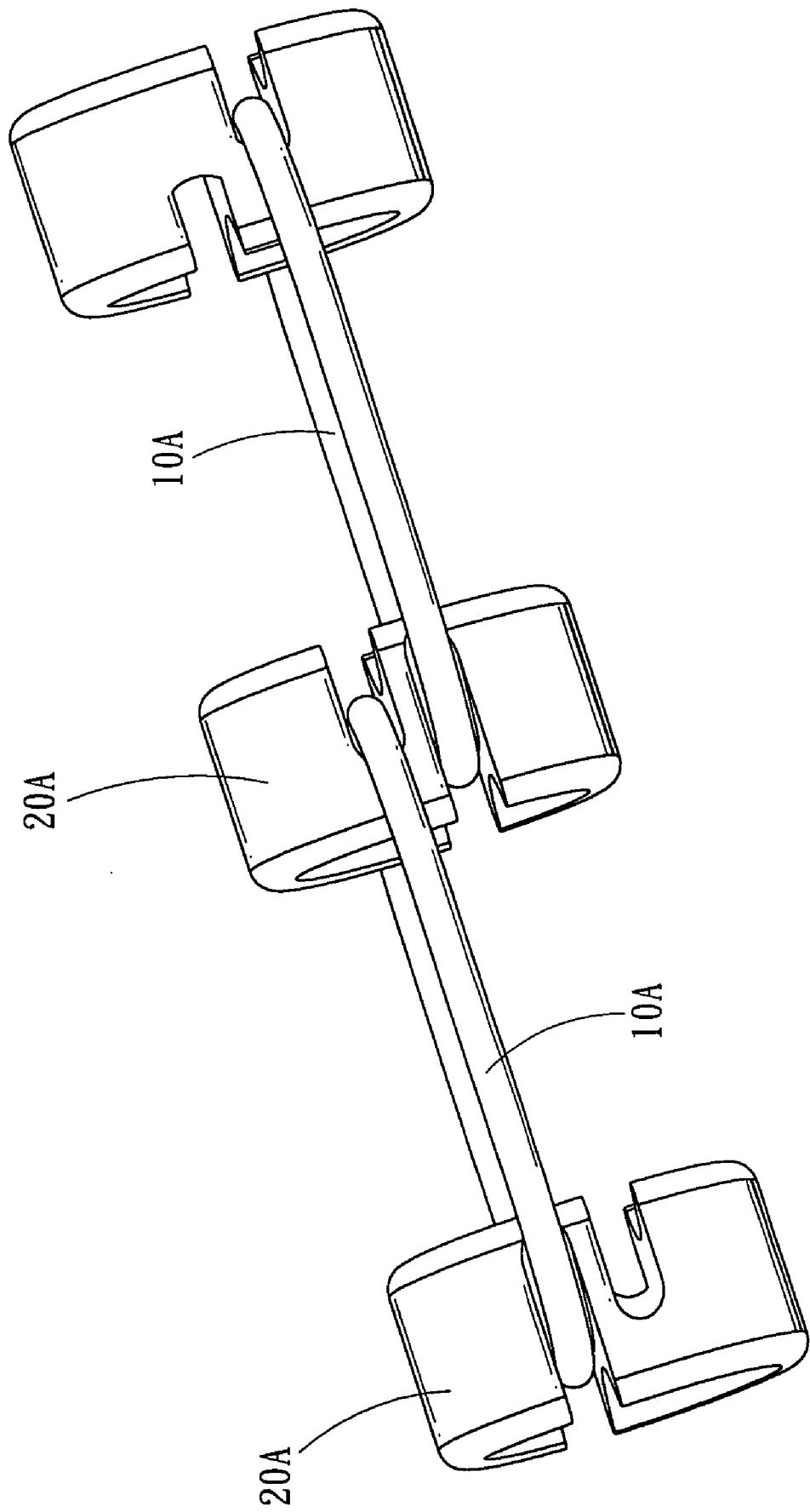
FIG. 6 is a perspective view of a rolling element retainer in accordance with another embodiment of the present invention.
Figure 7:
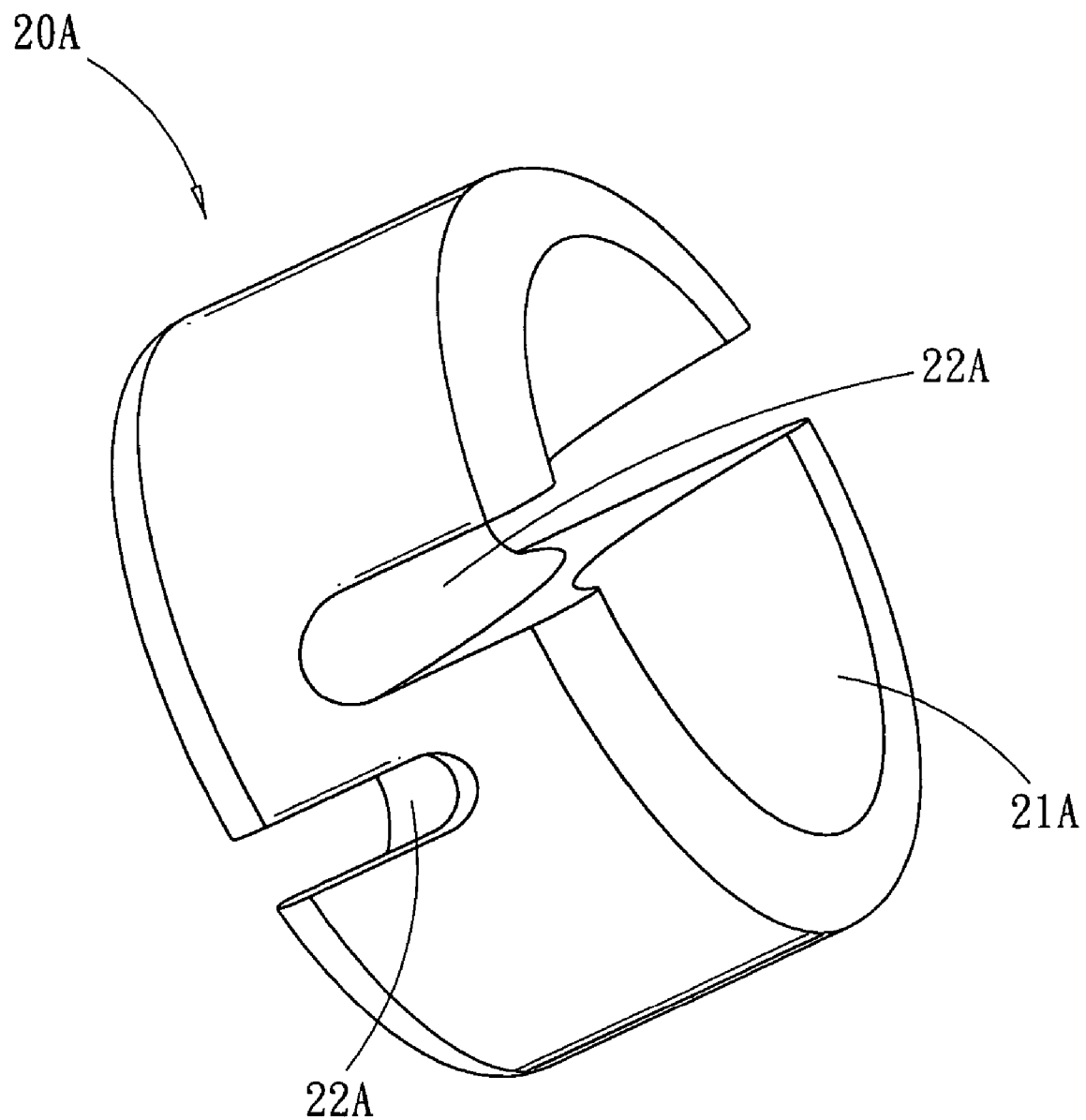
FIG. 7 is a perspective view of a partition of FIG. 6.
Figure 8:
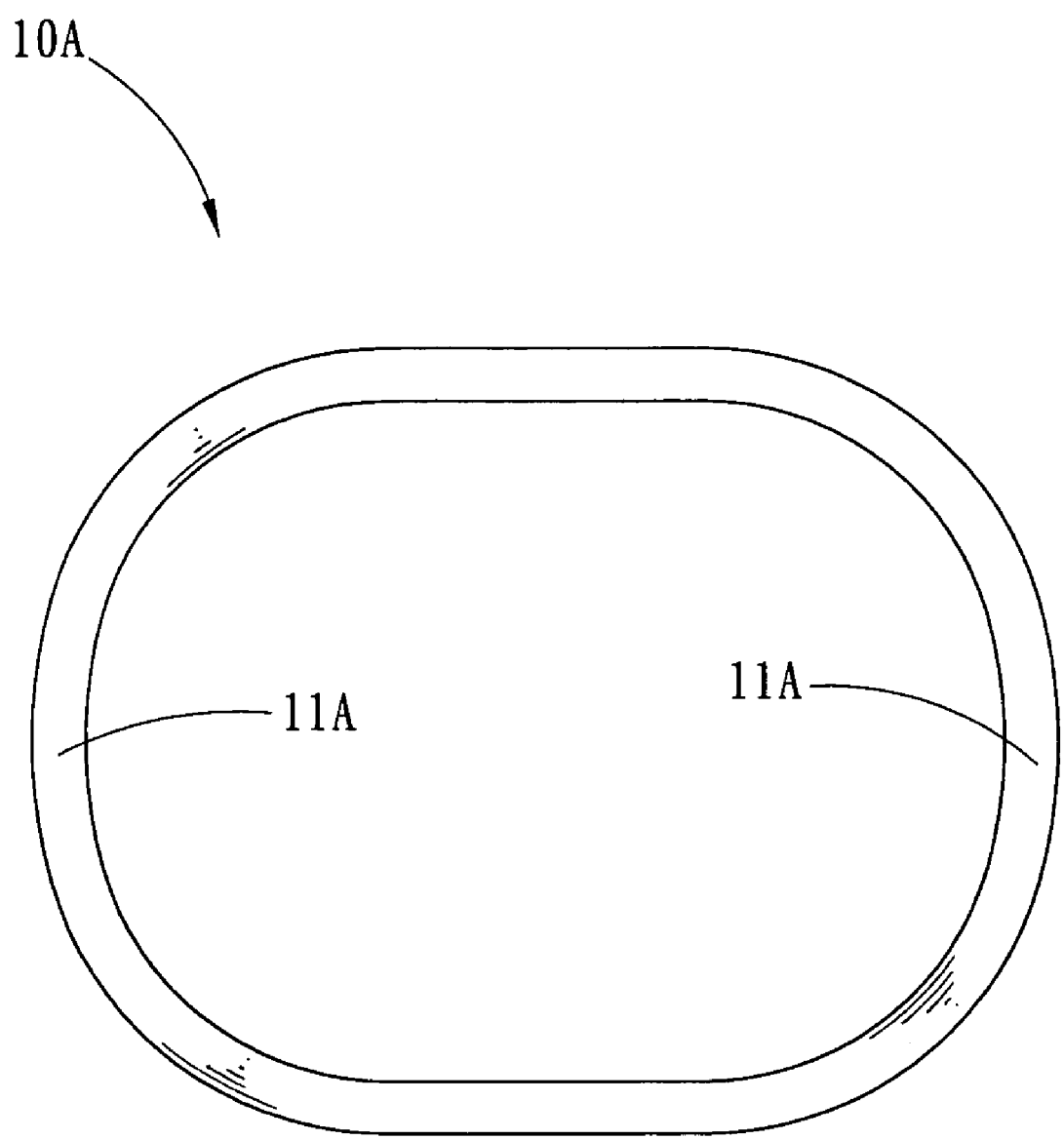
FIG. 8 is an illustrative view of a link-ring in FIG. 6.

Referring to FIGS. 6–8, which shows a rolling element retainer in accordance with another embodiment of the present invention, wherein the rolling element retainer generally comprises partitions 20A and link-rings 10A, the greatest distinction of this rolling element retainer over that of the prior embodiment in this case is that the ring 10A is complete-ring shaped as having ring portions 11A defined at its both sides. Whereas on both sides of the partition 20A is provided an trough 22A having a curved bottom, in this way, a rolling element retainer can be formed by engaging the ring portions 11A of plural link-rings 10A respectively in the troughs 22A of plural partitions 20A. The structure of this kind of rolling element retainer is relative simpler and has symmetry, the ejection molding of which is relatively easier, thereby the production cost can be accordingly reduced. Furthermore, this rolling element retainer is easy to be assembled.

Figure 9:
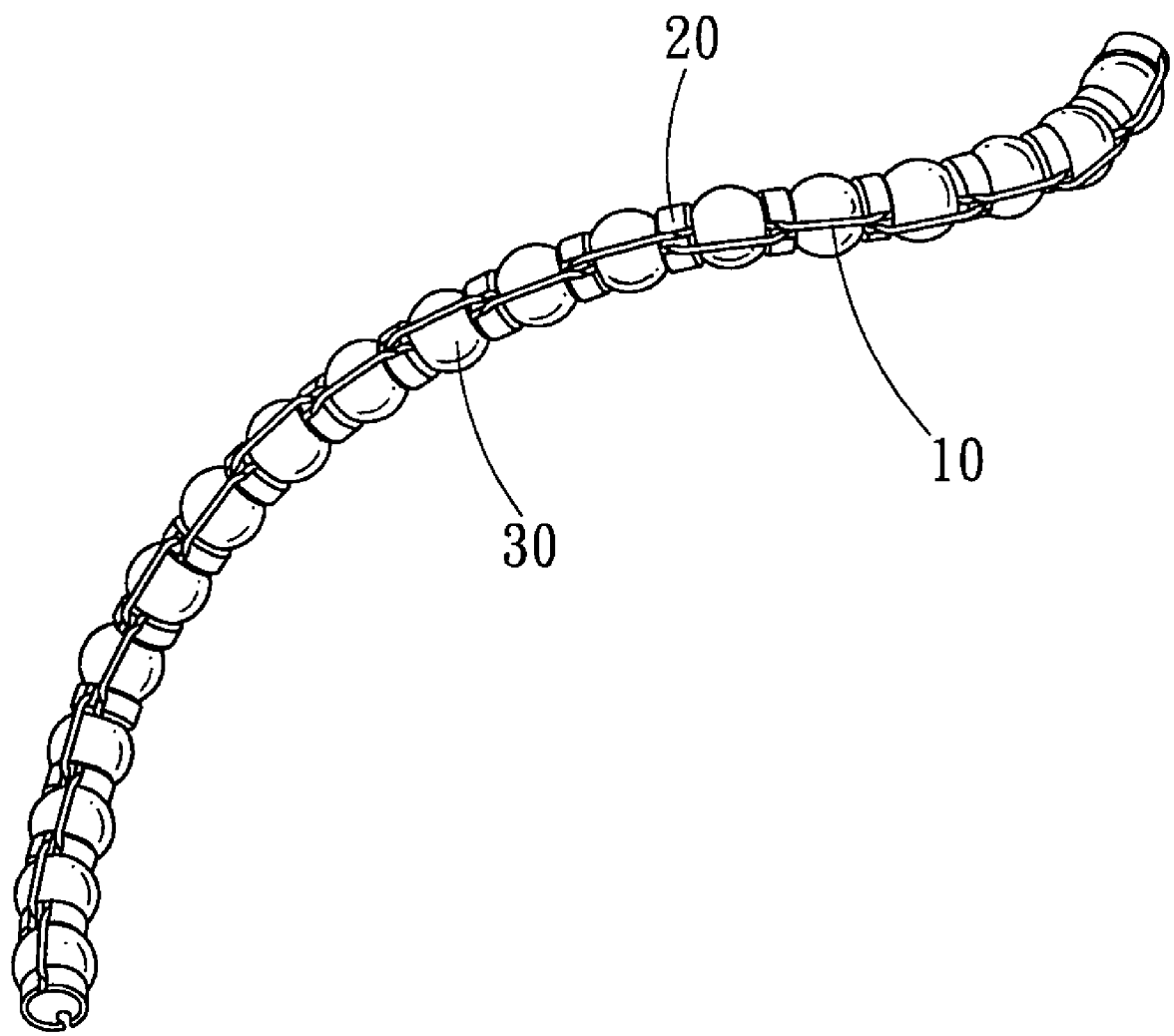
FIG. 9 shows a rolling element retainer being curved like a corkscrew.
Figure 10:
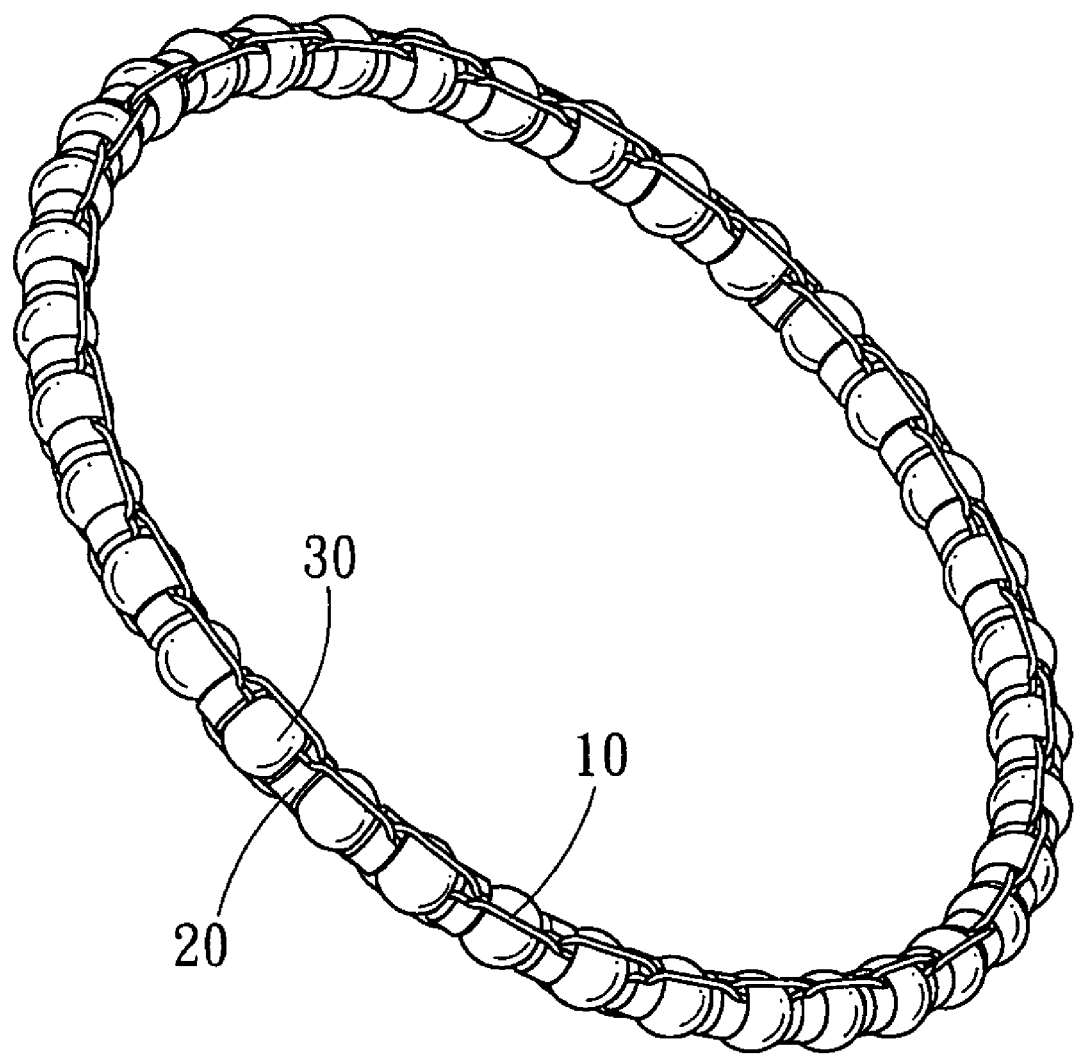
Figure 11:
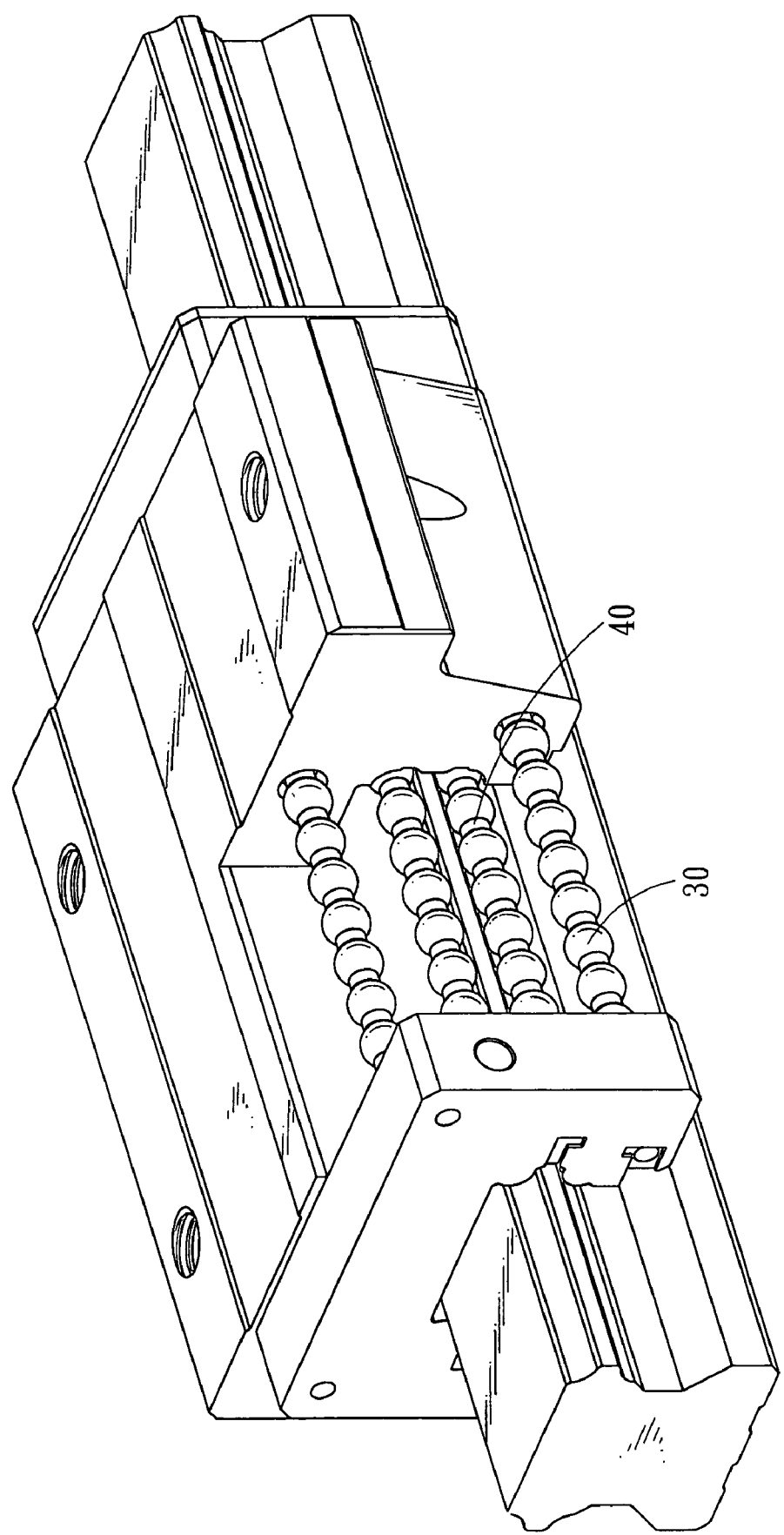
FIG. 11 is a perspective view of a conventional single cage for rolling element.
Figure 12:
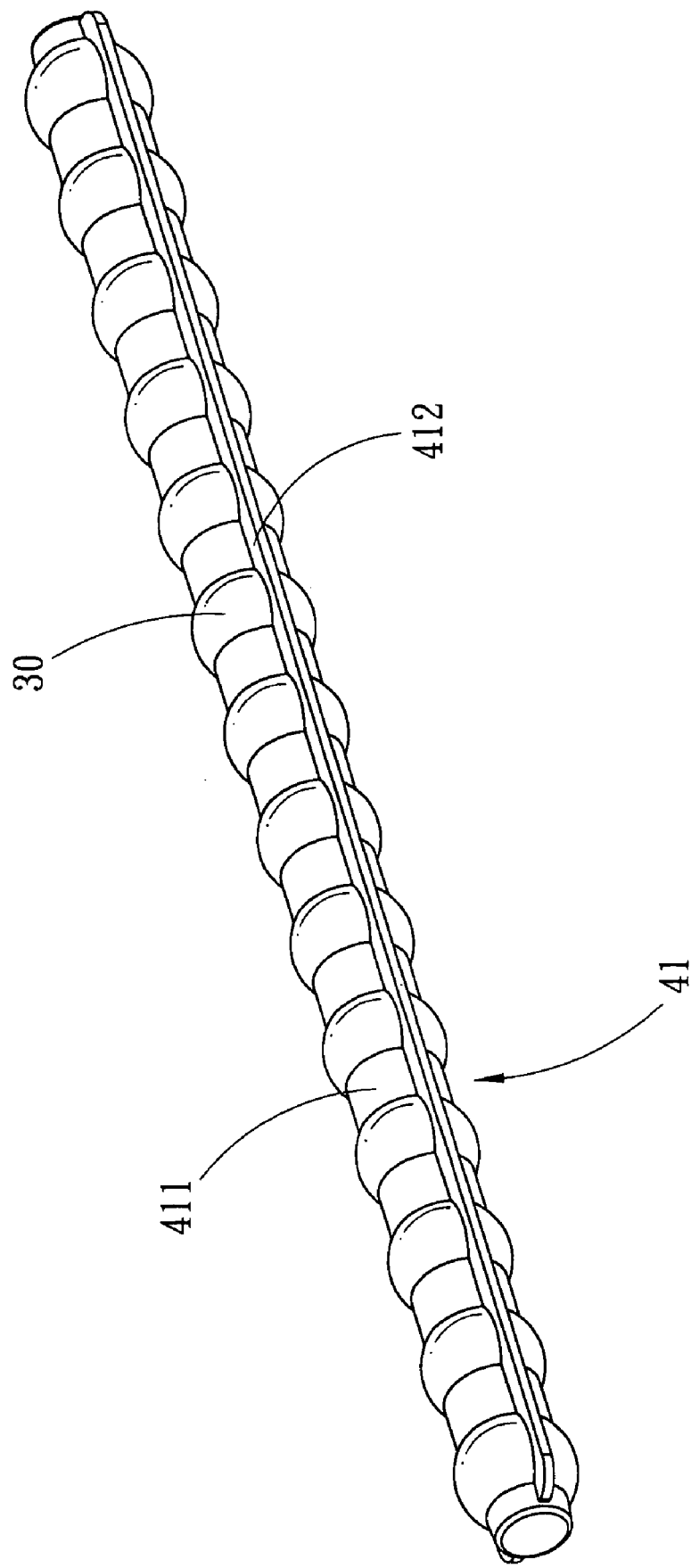
FIG. 12 is a perspective view of a conventional rolling element retainer comprised of plural single retainers.

FIG. 9 shows a rolling element retainer being curved like a corkscrew. FIG. 10 shows both ends the curved rolling element retainer in FIG. 9 being connected together to form a ring shape. Wherein rolling elements 30 are confined in the intervals between the respective link-rings 10 and the partitions 20, it can be learned from the drawings that the rolling element retainer of the present invention can be universally turned, which is most applicable to ball screw, linear guideway, linear ball bearing and such kind of linear transmission devices. In particularly, ball screw should be provided with the rolling element retainer which can be freely turned in universal direction. The link-ring and the partition in accordance with the present invention can be made of wear-resisting flexible material, so as to improve the cornering ability and prolong the service life of the rolling element retainer of the present invention.

It is concluded from the above descriptions that the rolling element retainer in accordance with the present invention is possessed with the following advantages:

First, the rolling element retainer in accordance with the present invention is comprised of multiple independent units (each unit includes a link-ring and a partition), and the cornering ability of which is not achieved by deformation of the device but by the relative angular movement between the respective independent units, so as to ensure that the rolling element retainer can slide smoothly along the circulation path of the linear transmission device.

Second, the rolling element retainer in accordance with the present invention is comprised of multiple independent units, the respective units are simple structured as being formed by normal ejection molding, in this case, the production cost of it can be substantially lowered.

Third, the respective units of the rolling element retainer in accordance with the present invention are allowed to move angularly with respective to each other, and, the engagement between the ring portion and the trough of the respective units is in form of the engagement of cylindrical ring portion with curved surface. By this way, the universal cornering ability of the rolling element retainer in accordance with the present invention can be substantially improved, which is able to slide smoothly along the circulation path of the linear transmission device without being warped.

Fourth, the connecting and the partition of the present invention can be made of wear-resisting flexible material, so as to improve the cornering ability and prolong the service life of the rolling element retainer of the present invention.

While we have shown and described various embodiments in accordance with the present invention, it should be clear to those skilled in the art that further embodiments may be made without departing from the scope of the present invention.

What is claimed is:

1. A rolling element retainer comprising:
   a plurality of partitions for separating sequential rolling elements from each other, each partition is provided at both sides with a curved face in corresponding to a curvature of the rolling elements;
   a plurality of link-rings for connecting the partitions together;
   wherein each of the partitions and the link-rings is an independent unit, the rolling element retainer comprises a plurality of such independent units, the engagement between the respective independent units is achieved by a cylindrical ring portion swingably engaged with a curved surface, by this way, a rolling element retainer can be formed by alternatively connecting the link-rings and the partitions together, and such that the rolling element retainer can have a good cornering ability.

2. The rolling element retainer as claimed in claim 1, wherein the respective link-rings and the partitions are made of wear-resisting flexible material, so as to improve the cornering ability and prolong the service life of the rolling element retainer.

3. The rolling element retainer as claimed in claim 1, wherein the ring portion of each of the link-rings is slightly cylindrical shaped, so as to allow relative angular movement in vertical direction between the partition and the link-ring.

4. The rolling element retainer as claimed in claim 1, wherein each of the partitions is provided with a trough, whereas each of the link-rings is provided with ring portion, a rolling element retainer with desired length can be formed by engaging the ring portion of the link-rings in the trough of the partitions.

5. The rolling element retainer as claimed in claim 4, wherein the trough of each of the partitions is formed with a curved bottom so as to allow relative angular movement in left-to-right direction between the partition and the link-ring.

6. The rolling element retainer as claimed in claims 4 or 5, wherein each of the link-rings is an O-ring shaped structure having a ring portion defined at its both sides, on both sides of each of the partitions is provided an trough, so that a rolling element retainer with desired length can be formed by engaging the ring portions of the link-rings respectively in the troughs of the partitions.

7. The rolling element retainer as claimed in claims 4 or 5, wherein each of the link-rings is a C-shaped ring having two fixing ends, and another side of each of the partitions opposite to the trough is provided with a groove for engaging with the fixing ends of the link-ring, such that the link-ring can be connected to the partition.

* * * * *